(12) United States Patent
Chang

(10) Patent No.: US 8,078,222 B2
(45) Date of Patent: Dec. 13, 2011

(54) PORTABLE ELECTRONIC DEVICE

(75) Inventor: Keng-Ming Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 672 days.

(21) Appl. No.: 12/177,437

(22) Filed: Jul. 22, 2008

(65) Prior Publication Data

US 2009/0163242 A1 Jun. 25, 2009

(30) Foreign Application Priority Data

Dec. 19, 2007 (CN) .......................... 2007 1 0203232

(51) Int. Cl.
*H04B 1/38* (2006.01)
*H04M 1/00* (2006.01)
(52) U.S. Cl. ...................................... 455/557; 455/550.1
(58) Field of Classification Search ............... 455/575.1, 455/575.2, 550.1, 569.1; 379/174, 420.04, 379/430, 431
See application file for complete search history.

(56) References Cited

U.S. PATENT DOCUMENTS

| 6,819,942 | B2 * | 11/2004 | Aotake et al. | 455/556.1 |
| 6,999,586 | B2 * | 2/2006 | Yun | 379/444 |
| 2006/0019729 | A1 * | 1/2006 | Harris | 455/575.6 |
| 2006/0094481 | A1 * | 5/2006 | Gullickson | 455/575.2 |
| 2007/0086764 | A1 * | 4/2007 | Konicek | 396/56 |
| 2007/0139553 | A1 * | 6/2007 | Kister et al. | 348/468 |
| 2008/0161067 | A1 * | 7/2008 | Reda et al. | 455/569.1 |

* cited by examiner

*Primary Examiner* — George Eng
*Assistant Examiner* — Michael Faragalla
(74) *Attorney, Agent, or Firm* — Altis Law Group, Inc.

(57) ABSTRACT

A portable electronic device includes a first main body, an audio processor mounted in the main body, a camera module mounted in the main body, and an earphone signal connected with the first main body. A first input-output port disposed on the main body is coupled with the audio processor and the camera module. The earphone includes a second main body, and a second input-output port coupled to the second main body to facilitate audio signal transmissions between the audio processor and the earphone and output control signals from the earphone to the camera module.

7 Claims, 2 Drawing Sheets

PORTABLE ELECTRONIC DEVICE

BACKGROUND

1. Technical Field

The present invention relates to portable electronic devices, particularly, to a portable electronic device with a camera module.

2. Discussion of Related Art

Portable electronic devices such as mobile phones and personal digital assistants (PDAs) are now in widespread use, and consumers can enjoy maximum convenience provided by such multi-functional devices.

Camera modules are often incorporated in portable electronic devices to allow image and/or video capture and transmission. Usually, a shutter of the camera module is disposed on the main body of the portable electronic device. Such portable electronic devices are normally handheld when in use. Such positioning, however, often causes stability problems affecting capture quality. Additionally, performance of the camera module can be limited by the proximity of such positioning for self-capture function.

Therefore, what is needed is a portable electronic device capable of overcoming the described limitations.

SUMMARY

A portable electronic device includes a first main body, an audio processor mounted in the main body, a camera module mounted in the main body, and an earphone signal connected with the first main body. A first input-output port disposed on the main body and coupled with the audio processor and the camera module facilitates audio signal transmissions between the audio processor and the earphone and input control signals from the earphone to the camera module. The earphone includes a second main body, and a second input-output port coupled to the second main body to facilitate audio signal transmissions between the audio processor and the earphone and output control signals from the earphone to the camera module.

BRIEF DESCRIPTION OF THE DRAWINGS

Many aspects of the present portable electronic device can be better understood with reference to the following drawings. The components in the drawings are not necessarily to scale, the emphasis instead being placed upon clearly illustrating the principles of the present portable electronic device. Moreover, in the drawings, like reference numerals designate corresponding parts throughout the several views.

DETAILED DESCRIPTION OF PREFERRED EMBODIMENTS

Reference will now be made to the drawings to describe in detail of the exemplary embodiment of the portable electronic device.

Figure 1:
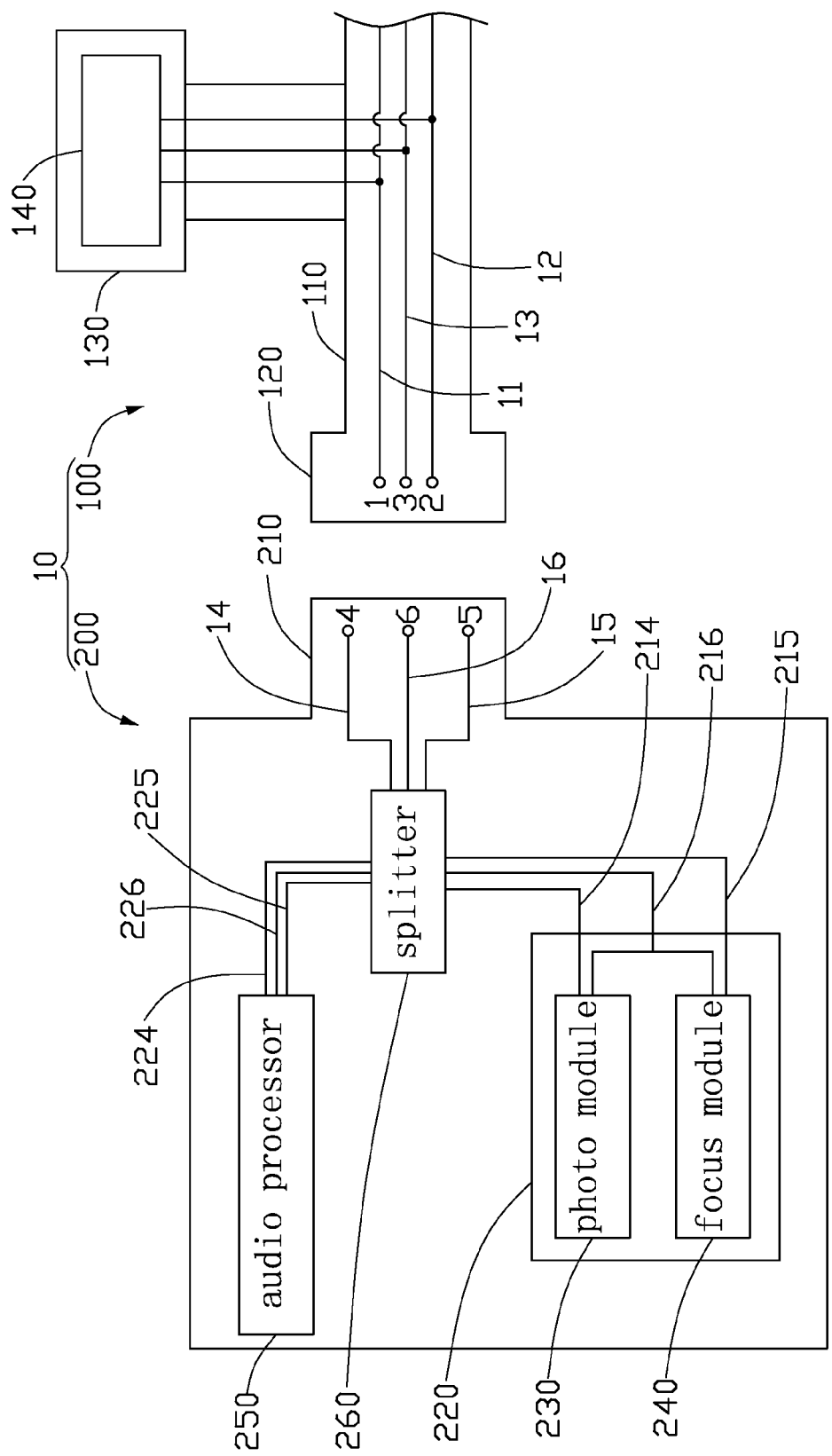
FIG. 1 is a schematic diagram of a portable electronic device in accordance with an exemplary embodiment.

Referring to FIG. 1, a portable electronic device, here a mobile phone 10 as an example, in accordance with a present embodiment, includes an earphone 100 and a body casing 200.

In the present embodiment, the earphone 100 is a wire assembly. The earphone 100 includes a body 130, a plug 120, and a signal wire 110 connected with the body 130 and the plug 120. An input keypad 140 is mounted on the body 130.

The signal wire 110 includes a first signal wire 11, a second signal wire 12, and a third signal wire 13. The plug 120 has a first pin 1 coupled to the first signal wire 11, a second pin 2 coupled to the second signal wire 12, and a third pin 3 coupled to the third signal wire 13.

Figure 2:
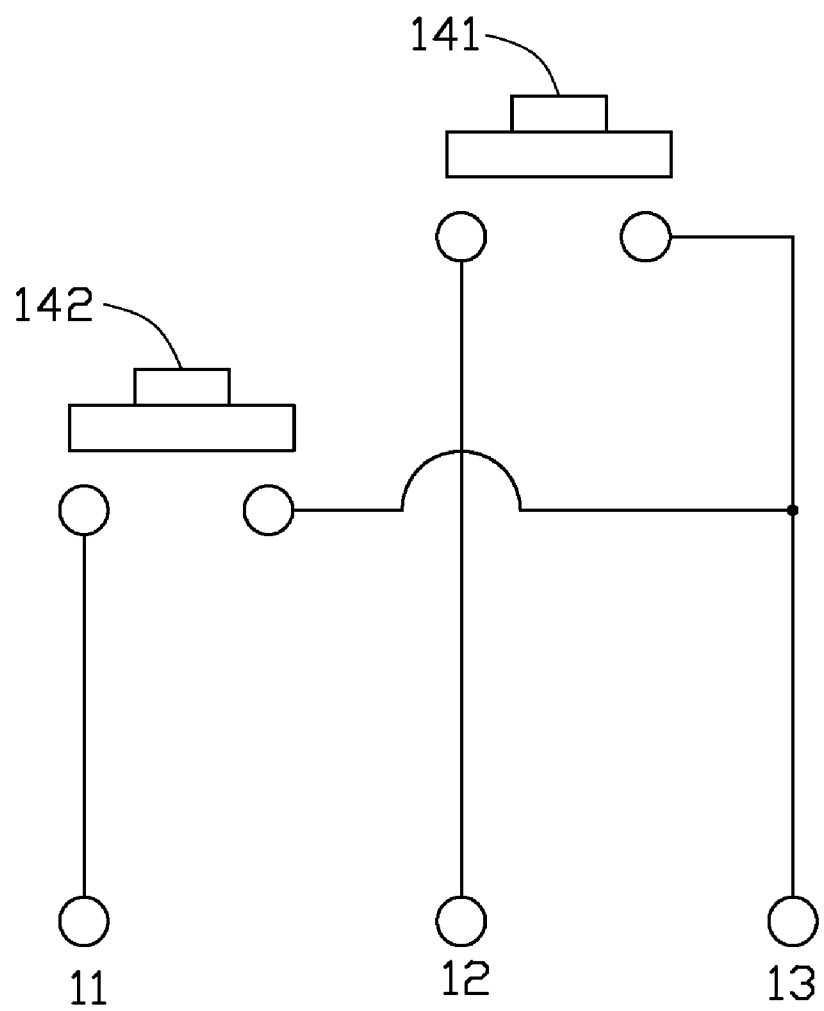
FIG. 2 illustrates a circuit of an input keypad of the portable electronic device.

Referring to FIG. 2, the input keypad 140 includes a first button 141 and a second button 142. The first button 141 is configured for connecting the second signal wire 12 to the third signal wire 13, and the second button 142 is configured for connecting the first signal wire 11 to the third signal wire 13.

The mobile phone 10 further includes an audio processor 250, a camera module 220, and an input-output interface 210. The camera module 220 and the audio processor 250 are mounted in the body casing 200. The input-output interface 210 may be disposed on the top, bottom, left or right side, or other location on the body casing 200. The audio processor 250, the camera module 220, and the input-output interface 210 are coupled to each other by a splitter 260. The earphone 100 can be removably attached to the body casing 200 via the input-output interface 210.

Three signal wires (224, 225, 226) are connected between the audio processor 250 and the splitter 260. Two of the signal wires (224, 225, 226) respectively correspond to a left earpiece receiver and a right earpiece receiver. The other signal wire (224, 225, 226) acts as a ground wire. Three signal wires (214, 215, 216) are connected between the camera module 220 and the splitter 260. The splitter 260 is configured for switching between delivering the audio signal, or send/receive mode, and transmitting the control signal to the camera module 220, or image capture mode.

The input-output interface 210 includes a fourth connector 4, a fifth connector 5, and a sixth connector 6. A fourth signal wire 14 coupled to the fourth connector 4, a fifth signal wire 15 coupled to the fifth connector 5, and a sixth signal wire 16 coupled to the sixth connector 6 are connected to the splitter 260. When the plug 120 engages the input-output interface 210, first pin 1, second pin 2, and third pin 3 are respectively coupled to the fourth connector 4, the fifth connector 5, and the sixth connector 6.

When the mobile phone 10 is in send/receive mode, the earphone 100 is coupled to the audio processor 250 by the splitter 260, such that audio signals can be transferred from the body casing 200 to the earphone 100, and from the earphone 100 to the body casing 200.

When the mobile phone 10 is in image capture mode, the earphone 100 is coupled to the camera module 220 by the splitter 260, whereby the control signal for the camera module 220 can be transferred from the earphone 100 to the body casing 200, allowing the camera module 220 to be used in a hands free manner.

The camera module 220 includes a photo module 230 for capturing images and a focus module 240 for focusing the camera module 220. When the mobile phone 10 is in image capture mode, the fourth signal wire 14 is coupled to the signal wire 214, the fifth signal wire 15 is coupled to the signal wire 215, and the sixth signal wire 16 is coupled to the signal wire 216 by the splitter 260. The signal wires 214 and 216 are connected to the photo module 220. The signal wires 215 and 216 are connected to the focus module 240. Referring to FIG. 2, when the first button 141 is pushed, the fifth signal wire 5 and the sixth signal wire 6 connect with the focus module 240. When the second button 142 is pushed, the fourth signal wire 4 and the sixth signal wire 6 connect with the photo module 230.

In another embodiment, the input-output interface 210 can be a wireless communication port, such as a bluetooth device or infrared connector. Correspondingly, the earphone 100 can be replaced by a blue-tooth earphone or an infrared earphone.

Unlike conventional devices, the control signal for the camera module can be transferred from the earphone to the main body of the mobile phone, allowing the camera module in the mobile phone to be used in a hands free manner.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A portable electronic device, comprising:
    a first main body,
    an earphone comprising a second main body separated away from and movable independent of the first main body,
    an audio processor and a camera module, the audio processor and the camera module being mounted in the first main body,
    a first input-output port disposed on the first main body and coupled with the audio processor and the camera module; and
    a second input-output port coupled to the second main body;
    wherein the earphone further comprises an input keypad mounted in the second main body and operable to input control signals of the camera module, the second input-output port connects to the first input-output port to facilitate audio signal transmissions between the audio processor and the earphone and to output the control signals from the earphone to the camera module to control the camera module;
    wherein the earphone is detachably attached to the first input-output port via the second input-output port;
    wherein the earphone further comprises a signal wire, and the signal wire connects the second main body to the second input-output port;
    wherein the signal wire comprises a first signal wire, a second signal wire, and a third signal wire; and the second input-output port is a plug comprising a first pin coupled to the first signal wire, a second pin coupled to the second signal wire, and a third pin coupled to the third signal wire;
    wherein the input keypad comprises a first button and a second button, the first button is configured for connecting the second signal wire to the third signal wire, and the second button is configured for connecting the first signal wire to the third signal wire.

2. The portable electronic device of claim 1, further comprising a splitter coupled to the audio processor, the camera module, and the first input-output port; the splitter being configured for selectively connecting the first input-output port to the camera module for the output of the control signal or to the audio processor for the audio signal transmissions.

3. The portable electronic device of claim 1, wherein the first input-output port wirelessly connects the second input-output port.

4. The portable electronic device of claim 1, wherein the first input-output port and the second input-output port are infrared connectors.

5. The portable electronic device of claim 1, wherein the first input-out portion is an input-output interface comprising a first connector, a second connector, and a third connector, and when the plug is engaged in the input-output interface, the first pin, the second pin, and the third pin are respectively coupled to the first connector, the second connector, and the third connector.

6. The portable electronic device of claim 5, wherein the camera module comprises a photo module for capturing images and a focus module for focusing the camera module.

7. The portable electronic device of claim 6, wherein the camera module further comprises a fourth signal wire, a fifth signal wire, and a sixth signal wire, wherein the fourth signal wire and the sixth signal wire are connected to the photo module, and the fifth signal wire and the sixth signal wire are connected to the focus module, and when the earphone outputs the control signals to the camera module, the first connector is coupled to the fourth signal wire, the second connector is coupled to the fifth signal wire, and the third connector is coupled to the sixth signal wire.

* * * * *